United States Patent
Yamakawa et al.

(10) Patent No.: US 6,198,991 B1
(45) Date of Patent: Mar. 6, 2001

(54) LOW-NOISE LEVEL LANDING APPARATUS AND SYSTEM FOR HELICOPTERS

(75) Inventors: Eiichi Yamakawa; Natsuki Kondo; Hiroki Nishimura, all of Kakamigahara (JP)

(73) Assignee: Advanced Technology Institute of Commuter-Helicopter, Ltd., Gifu (JP)

( * ) Notice: Subject to any disclaimer, the term of this patent is extended or adjusted under 35 U.S.C. 154(b) by 0 days.

(21) Appl. No.: 09/250,276

(22) Filed: Feb. 16, 1999

(30) Foreign Application Priority Data

Mar. 25, 1998 (JP) .................................................. 10-077252

(51) Int. Cl.$^7$ ....................................................... D05D 1/00
(52) U.S. Cl. ........................ 701/16; 701/210; 244/17.13; 244/183
(58) Field of Search ............................. 701/16, 3, 4, 209, 701/210; 244/17.13, 183, 188, 194, 195

(56) References Cited

U.S. PATENT DOCUMENTS 4,232,839  11/1980  Sicre et al. ............................ 244/188

FOREIGN PATENT DOCUMENTS

| 44 20 059 | 12/1995 | (DE) . |
|---|---|---|
| 06206594 | 7/1994 | (JP) . |
| 08007199 | 1/1996 | (JP) . |
| 09211099 | 8/1997 | (JP) . |
| 09254897 | 9/1997 | (JP) . |

*Primary Examiner*—William A. Cuchlinski, Jr.
*Assistant Examiner*—Arthur D. Donnelly
(74) *Attorney, Agent, or Firm*—Wenderoth, Lind & Ponack, L.L.P.

(57) ABSTRACT

A low-noise level landing apparatus for helicopters comprises a helicopter position calculator for calculating the position of the helicopter, a data input device, an air data sensor for measuring an airspeed and a descending angle, a rotor tachometer for detecting a rotor rotational speed, a memory and a fuel gauge for calculating the weight of the helicopter, a rotor rotational speed controller for controlling the rotor rotational speed, a BVI noise generating area database device for storing noise levels in accordance with parameters of descending speed, airspeed, descending angle, rotor rotational speed and weight of the helicopter. A computer selects a flight route, an airspeed, a descending angle and a rotor rotational speed wherein noise is reduced, by setting a plurality of flight routes on the basis of the helicopter position and landing point and by referring to the noise generating area database device. Low-noise level landing is then carried out by pilot manual control or automatic flight control. By modifying the selected flight route on the basis of ground noise data received by a data receiver, the optimal flight route is reselected. As a result, a flight route wherein noise reduction can be attained during landing can be selected more properly.

6 Claims, 7 Drawing Sheets

LOW-NOISE LEVEL LANDING APPARATUS AND SYSTEM FOR HELICOPTERS

BACKGROUND OF THE INVENTION

Field of the Invention

The present invention relates to a low-noise level landing apparatus and system for helicopters, which is intended to reduce noise generated during landing approach.

Noise generated from a helicopter during landing approach is mostly caused by the rotation of a main rotor. In particular, BVI (blade vortex interaction) noise is an impulsive noise which is caused by a sudden change of the blade air load during the interaction between the blade and previously shed blade tip vortex. The BVI noise, if generated, is louder than any other noise sources.

FIG. 8 is a graph showing an example of a BVI noise generating area with respect to the airspeed and descending speed of a helicopter. In this example, it is understood that the BVI noise is generated when the airspeed is in the range of 40 to 120 kt (knots) and the descending speed is in the range of 300 to 1,200 ft (feet)/minute, and that the BVI noise is loudest when the descending angle is in the range of 4° to 6°.

For this reason, in order to minimize the BVI noise, it is desired that a helicopter should take a curved flight route by continuously changing the descending angle from the start of landing in order to avoid the BVI noise generating area.

However, it is very difficult for the pilot to bear the noise generating conditions shown in FIG. 8 in mind, to select a low-noise level flight route with the aid of instruments while manually controlling the helicopter. In particular, safety is the top priority during landing, and noise reduction is apt to be of secondary importance.

As an example of prior art, Japanese Patent No. 2,736,045 (Japanese Patent Application No. Hei 8-63558) has been disclosed, wherein a flight route is selected on the basis of a BVI noise generating area database obtained by previous analyses, flight tests and the like. However, the BVI noise generating area is subjected to the effects of meteorological conditions, in particular, the effect of wind, whereby low-noise level landing approach may not be accomplished in some cases.

FIG. 9 is a graph showing how the BVI noise generating area is changed. A flight route P1 is selected on the basis of the BVI noise generating area database. When meteorological conditions are no wind and the same as those under which the BVI noise generating area database is obtained, this route becomes a low-noise level landing route.

However, if the shape and position of the BVI noise generating area are changed by the effect of wind, the flight route P1 enters the BVI noise generating area, and is no longer a low-noise level route. As a matter of fact, a flight route P2 have been modified in accordance with the change of the area becomes a low-noise level landing route.

SUMMARY OF THE INVENTION

An object of the present invention is to provide a low-noise level landing apparatus and system for helicopters, capable of more properly selecting a flight route in which noise during landing approach can be reduced, in response to changes in meteorological conditions without imposing any additional burden on the pilot.

The present invention provides a low-noise level landing apparatus for helicopters, provided on a helicopter, comprising:

data receiving means for receiving noise data measured on a ground by data communication;

helicopter position calculating means for calculating a position of the helicopter;

landing route setting means for setting a landing route;

air data measuring means for measuring an airspeed and a descending speed;

rotor rotational speed measuring means for measuring a rotor rotational speed;

helicopter weight measuring means for measuring a weight of the helicopter;

noise generating area database means for storing noise levels with respect to parameters of descending speed, airspeed, descending angle, rotor rotational speed and helicopter weight; and flight route calculating means for determining a low-noise level flight route by setting a plurality of flight routes on the basis of the helicopter position and landing point and by referring to the noise generating area database with regard to those data from each measuring means, wherein the flight route calculating means modifies a preselected flight route on the basis of the noise data from the data receiving means and reselects an optimal flight route.

According to the invention, since noise levels with respect to parameters of descending speed, airspeed, descending angle, rotor rotational speed and helicopter weight have been stored, any change in noise level at a landing point in accordance with changes in flight conditions can be followed accurately. In addition, since the measuring means is provided for each parameter, the noise level at the landing point during flight can be grasped properly. The descending angle can be calculated from the descending speed and the airspeed. The descending speed can also be calculated as a change ratio of the position of the helicopter with time.

Furthermore, the low-noise level flight route can be selected by setting a plurality of flight routes on the basis of the helicopter position and landing point and by referring to the noise generating area database. Moreover, even if the current flight conditions are different from the conditions at the creation time of the database, the selection can be accomplished flexibly by judging the noise measured on the ground whether the selected flight route is optimal or not, and by modifying the flight route automatically or manually so that the flight route becomes the optimal flight route. Flight conditions to be considered are, for example, meteorological conditions such as wind direction, wind speed and amount of rainfall, as well as helicopter conditions for each model of helicopter such as engine characteristics, rotor characteristics and aerodynamic characteristics. Furthermore, the flight conditions can also include differences in local noise regulation around the heliport.

It is also possible to determine maneuvering conditions such as airspeed, descending angle and rotor rotational speed, in response to the optimal flight route. The maneuvering conditions thus determined may be indicated on instruments to assist pilot manual control, or may be used for automatic flight control by a computer or the like. In this way, noise reduction can be attained properly while reducing a burden on the pilot.

Furthermore, in the invention it is preferable that the helicopter position measuring means is composed of a differential GPS, and the data receiving means receives the noise data and differential GPS correction data.

According to the invention, by using the DGPS (Differential Global Positioning System) as the helicopter position measuring means, it is possible to obtain a measurement accuracy ten times higher than that of an ordinary GPS. The DGPS corrects natural errors by using a stationary GPS receiver, and eliminates the errors by transmitting data for correcting the errors to a mobile GPS receiver. Since the position of the helicopter is required to be obtained with high accuracy to assist pilot manual control and to accomplish automatic flight control, the application of DGPS seems to be promising for helicopters. When using the DGPS, a data communication apparatus for obtaining the correction data transmitted from the ground is required to be installed on the helicopter. In the case of the present invention, however, the noise data measured on the ground can be transmitted to the helicopter by using this kind of data communication without providing any special apparatus.

Furthermore, in the invention it is preferable that the low-noise level landing apparatus comprises noise level indicating means for indicating noise levels obtained by discriminating noise data on the basis of a plurality of threshold values, wherein the threshold values are variable in accordance with an altitude of the helicopter or a distance to the landing point.

According to the invention, when the pilot maneuvers the helicopter to carry out landing, the noise data measured on the ground is indicated at classified levels, whereby the pilot can accurately recognize whether a proper noise level is maintained in the current landing route or not.

Since the position of the helicopter is changing at this time with respect to the position of a microphone on the ground, the noise level to be measured becomes different in accordance with the difference in distance between the microphone and the helicopter even though the noise level generated by the helicopter remains the same.

To solve this problem, by varying the threshold value of noise level in which allowance is made for an effect of noise attenuation due to distance, in accordance with the direction and distance of the helicopter from the microphone, the accuracy of the noise level indicated on the helicopter side can be enhanced. As a result, it is possible to accurately grasp whether the BVI noise is generated or not. One microphone may be installed at one position on the ground, or a plurality of microphones may be installed around the landing point, and the values obtained by these microphones may be averaged.

Furthermore, the invention provides a low-noise level landing system for helicopters comprising:

noise measuring means provided on the ground for measuring noise of a helicopter;

data transmitting means provided on the ground for transmitting noise data measured by the noise measuring means to the helicopter by data communication;

data receiving means provided on the helicopter for receiving the noise data transmitted by the data transmitting means;

helicopter position measuring means provided on the helicopter for measuring a position of the helicopter;

landing route setting means provided on the helicopter for setting a landing route;

air data measuring means provided on the helicopter for measuring an airspeed and a descending angle;

rotor rotational speed measuring means provided on the helicopter for measuring a rotor rotational speed;

helicopter weight measuring means provided on the helicopter for measuring a weight of the helicopter;

noise generating area database means for storing noise levels with respect to parameters of descending speed, airspeed, descending angle, rotor rotational speed and helicopter weight; and flight route calculating means for determining a low-noise level flight route by setting a plurality of flight routes on the basis of the helicopter position and landing point and by referring to the noise generating area database with regard to those data from each measuring means, wherein the flight route calculating means modifies a preselected flight route, and reselects an optimal flight route.

According to the invention, since noise levels with respect to parameters of descending speed, airspeed, descending angle, rotor rotational speed and helicopter weight have been stored, any change in noise level at a landing point in accordance with changes in flight conditions can be followed accurately. In addition, since a measuring means is provided for each parameter, the noise level at the landing point during flight can be grasped properly. The descending angle can be calculated from the descending speed and airspeed. The descending speed can also be calculated as a change ratio of the position of the helicopter with time.

Furthermore, a low-noise level flight route can be selected by setting a plurality of flight routes on the basis of the helicopter position and landing point and by referring to the noise generating area database means. Moreover, even if the current flight conditions are different from the conditions at the creation time of the database, the selection can be accomplished flexibly by judging the noise measured on the ground whether the selected flight route is optimal or not, and by modifying the flight route automatically or manually so that the flight route becomes the optimal flight route. Flight conditions to be considered are, for example, meteorological conditions such as wind direction, wind speed and amount of rainfall, as well as helicopter conditions for each model of helicopter such as engine characteristics, rotor characteristics and aerodynamic characteristics. Furthermore, the flight conditions can also include differences in local noise regulation level around the heliport.

It is also possible to determine maneuvering conditions such as airspeed, descending angle and rotor rotational speed, in response to the optimal flight route. The maneuvering conditions thus determined may be indicated on instruments to assist pilot manual control, or may be used for automatic flight control by a computer or the like. In this way, noise reduction can be attained properly while reducing a burden on the pilot.

The noise generating area database means and the flight route calculating means are generally provided on the helicopter. It is also possible to have a system wherein data from each measuring means installed on the helicopter is transmitted to another aircraft or the ground station once, the optimal flight route is obtained by calculation by using the noise generating area database means and the flight route calculating means installed therein, and the result of the calculation is transmitted to the helicopter.

Furthermore, in the invention it is preferable that the helicopter position measuring means is composed of a differential GPS, the data transmitting means transmits the noise data and differential GPS correction data, and the data receiving means receives the noise data and the differential GPS correction data.

According to the present invention, by using the DGPS, it is possible to obtain a measurement accuracy ten times higher than that of an ordinary GPS. The DGPS corrects natural errors by using a stationary GPS receiver, and eliminates the errors by transmitting data for correcting the errors to a mobile GPS receiver. Since the position of the helicopter itself is required to be obtained with high accuracy to assist pilot manual control and to accomplish automatic flight control, the application of DGPS seems to be promising for helicopters. When using the DGPS, a data communication apparatus for obtaining the correction data is required to be installed on the helicopter. In the case of the present invention, however, the noise data measured on the ground can be transmitted to the helicopter by using this kind of data communication without providing any special apparatus.

In the invention it is preferable that the low-noise level landing system further comprises:
 a flight instrument provided on a helicopter for indicating the optimal flight route to the pilot; and
 a landing guide apparatus provided near a landing point on the ground for projecting a landing guide light beam toward the helicopter,
wherein a projection angle of the landing guide light beam is controlled on the basis of the optimal flight route.

According to the invention, the pilot can easily maintain landing control along a low-noise level route with reference to the optimal flight route indicated on the flight instrument. Furthermore, the pilot can easily perform low-noise level visual-flight landing with reference to the landing guide light beam projected from the landing guide apparatus.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
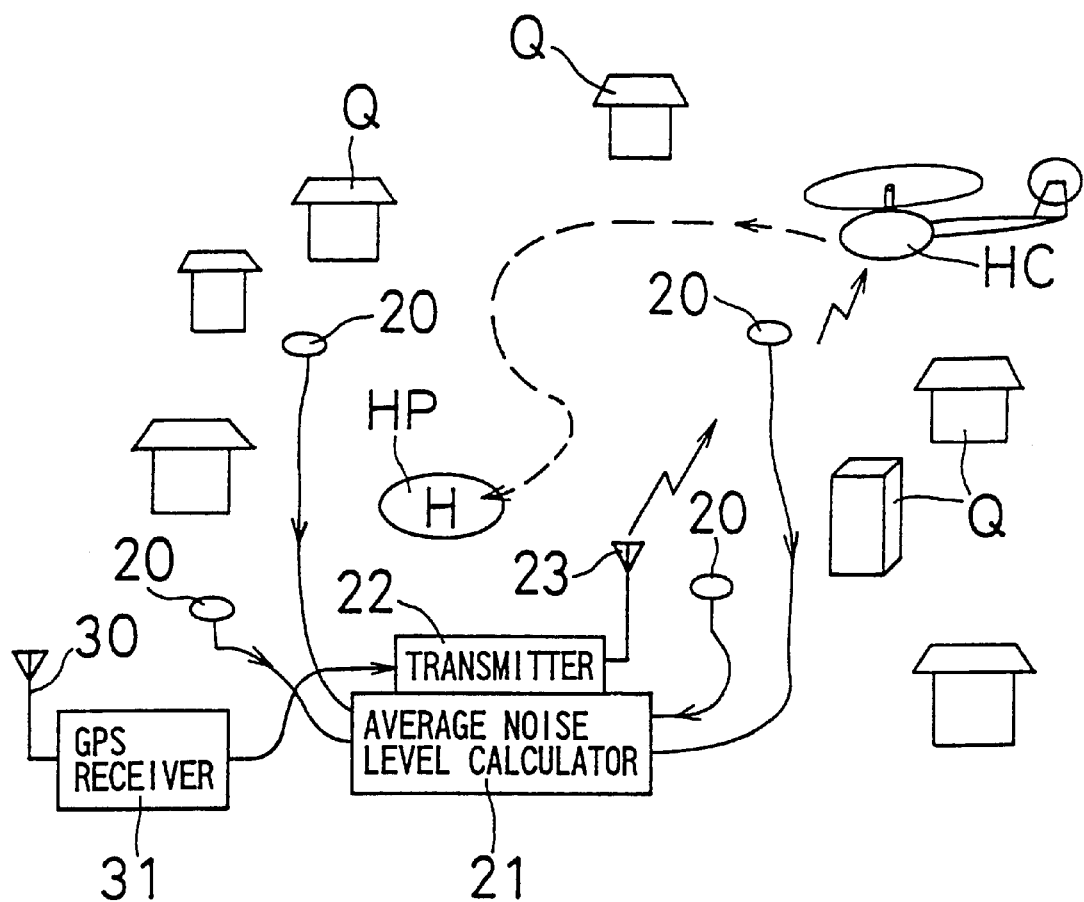
FIG. 1 is an overall perspective view showing a helicopter landing condition.

Now referring to the drawings, preferred embodiments of the invention are described below.

FIG. 1 is an overall perspective view showing a helicopter landing condition. A helicopter HC is flying toward a heliport HP, a landing point, and is supposed to land by taking an approach route formed of a complicated three-dimensional curve so as to reduce noise to be as low as possible at surrounding houses Q.

A plurality of microphones 20 are installed at a sufficient distance from each other around a heliport HP to measure noise generated from the helicopter HC. Noise signals from the microphones 20 are collected at one position, and input to an average noise level calculator 21, whereby the noise levels measured at all positions of the microphones 20 are monitored centralizedly. Noise data obtained by the average noise level calculator 21 is incorporated as one of information for data communication by a transmitter 22, and a radio wave is transmitted (up-linked) from an antenna 23. By receiving the radio wave from the antenna 23, the helicopter HC can obtain the noise data measured around the heliport.

On a ground side, an antenna 30 and a GPS receiver 31 for receiving GPS radio waves from GPS satellites are installed to generate correction data for DGPS. The DGPS correction data is incorporated as one of information for data communication by the transmitter 22, and transmitted together with the noise data to the helicopter HC.

With this configuration of such a ground station as described above, the helicopter HC can promptly receives the ground noise data and the DGPS correction data.

Figure 2:
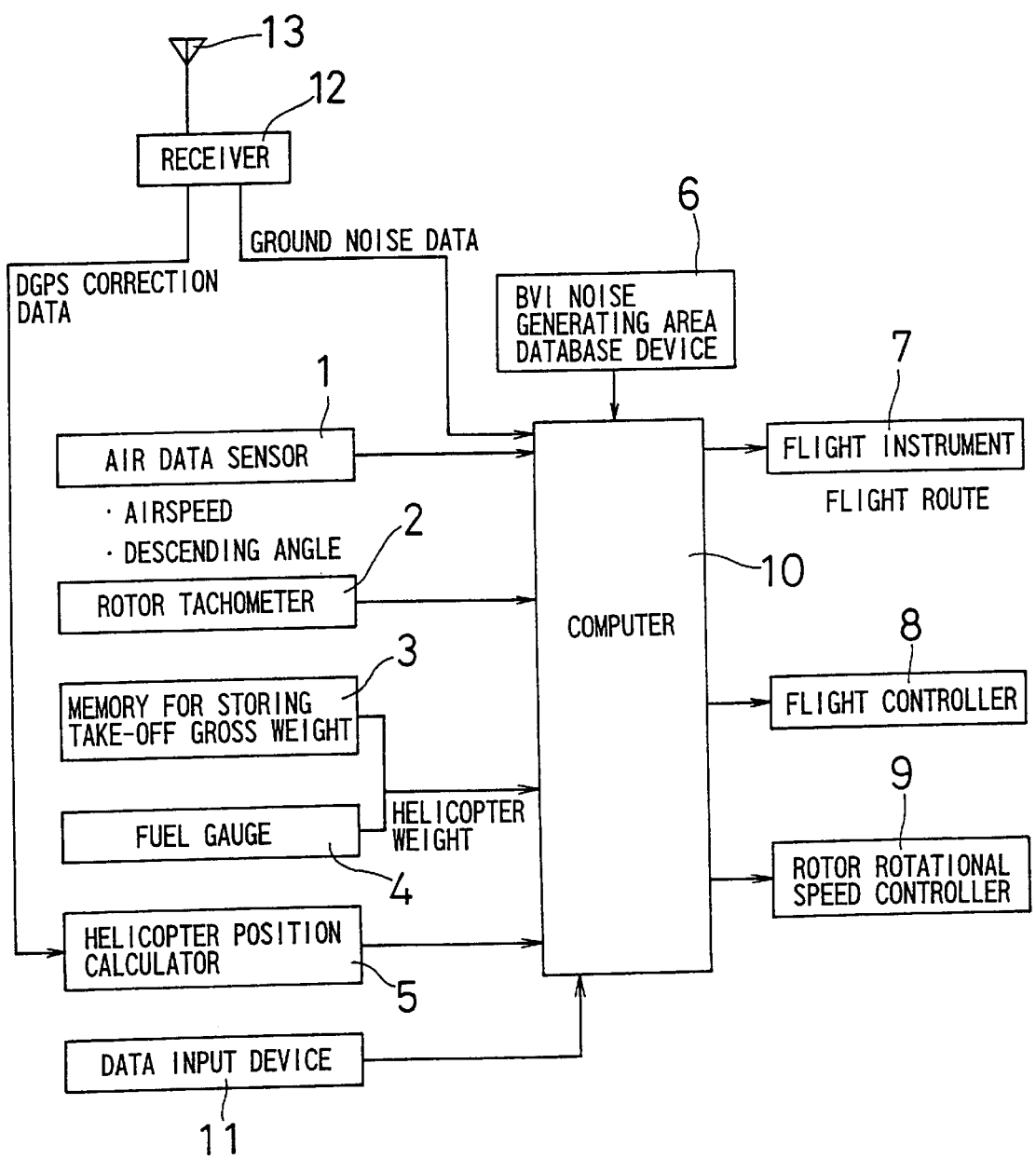
FIG. 2 is a block diagram showing an embodiment of the present invention.

FIG. 2 is a block diagram showing an embodiment of the present invention. In the low-noise level landing apparatus of the helicopter, an air data sensor 1 measures an airspeed and a descending speed, and calculates a descending angle by using those two data. A rotor tachometer 2 measures the rotational speed of a main rotor. Furthermore, a memory 3 for storing a take-off gross weight having been set before starting flight, and a fuel gauge 4 for measuring the amount of fuel consumption are provided. On the basis of these two numerical values, the current weight of the helicopter is calculated.

In addition, a helicopter position calculator 5 calculates the three-dimensional position of the helicopter and includes a GPS (Global Positioning System) which receives radio waves from a plurality of GPS satellites and measures the latitude, longitude and altitude of the helicopter on the principle of trigonometry. The helicopter position calculator 5 may be used together with a radio altimeter, a barometric altimeter or the like to improve the measurement accuracy of the altitude.

A data input device 11 comprises a keyboard, a numerical keypad, etc., and is used by the pilot of the helicopter to enter a variety of data. In the case of the present invention, the data input device 11 is used to set landing point and allowable noise levels. A BVI noise generating area database device 6 is formed of a mass storage device such as a magnetic disk to store BVI noise levels with respect to parameters of descending speed, airspeed, descending angle, rotor rotational speed and helicopter weight.

The level of the BVI noise changes depending on various flight conditions. The important parameters of the flight conditions are descending speed, airspeed, descending angle, rotor rotational speed and weight of helicopter. A change in the BVI noise level in accordance with changes in these various parameters can be obtained beforehand by actual measurement and analytical simulation. These data have been stored in the BVI noise generation range database device 6. The results of the actual measurement and analytical simulation have already been detailed in Japanese Patent Application No. Hei 8-63558 applied by the applicants of the present invention, and will not be described here.

A flight instrument 7 indicates the three-dimensional position and the flight direction of the helicopter, maps, etc. to the pilot as the form of digital indication, analog indication, indication on a screen and the like. A flight controller 8 is practically utilized as an AFCS (Automatic Flight Control System) and is used to automatically control the control system of the helicopter so as to guide the helicopter along a flight route which is calculated by the computer 10. A rotor rotational speed controller 9 controls the rotational speed of a rotor by changing RPM of the engine, or by using a continuously variable speed change mechanism provided between the engine and a main rotor shaft. These input and output devices are connected to a computer 10.

Furthermore, an antenna 13 and a receiver 12 are installed on the helicopter to receive radio waves transmitted from the ground station shown in FIG. 1. Demodulated ground noise data is transferred to the computer 10, and DGPS correction data is received by the helicopter position calculator 5. The helicopter position calculator 5 which has been received GPS data by itself, corrects GPS data by using the DGPS correction data, whereby the accuracy of the position of the helicopter itself can be ten times improved. If a measurement accuracy of 10 meter or less can be attained, for example, automatic landing control by a computer becomes promising. Additionally, the ground noise data is indicated to the pilot by the flight instrument 7 so as to be used as a guide for low-noise level landing control.

Figure 3:
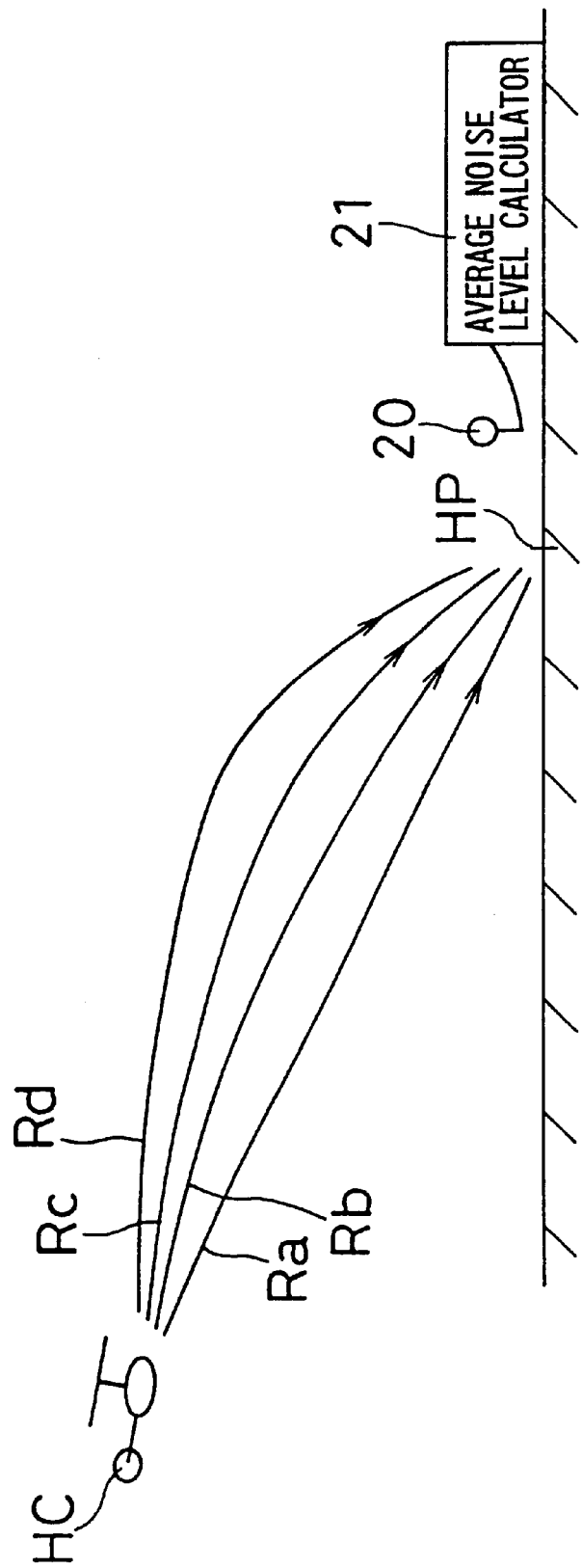
FIG. 3 is a view illustrating a method for selecting helicopter landing approach routes.
Figure 9:
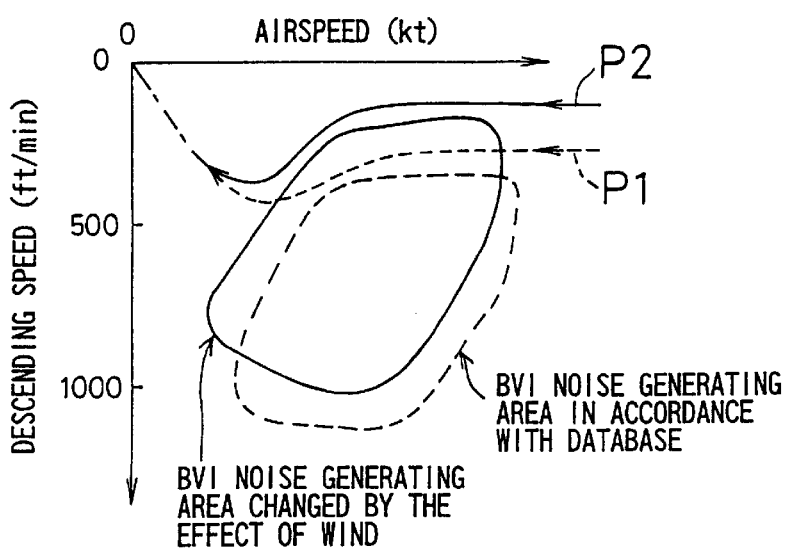
FIG. 9 is a graph showing how a BVI noise generating area is changed by the effect of wind.

FIG. 3 is a view illustrating a method for selecting helicopter landing approach routes. When the helicopter HC is going to approach to the heliport HP, the computer 10 sets a plurality of approach routes between the current helicopter position to the landing point. The BVI noise is changed greatly depending on various factors such as an airspeed and a descending speed as shown in FIG. 9. Therefore, among many approach routes, low-noise level approach routes are considerably limited in number. As examples of approach routes, FIG. 3 shows a flight route Ra, i. e., a straight approach route, and flight routes Rb to Rd wherein landing gradually becomes close to vertical landing in comparison with the flight route Ra.

Figure 4:
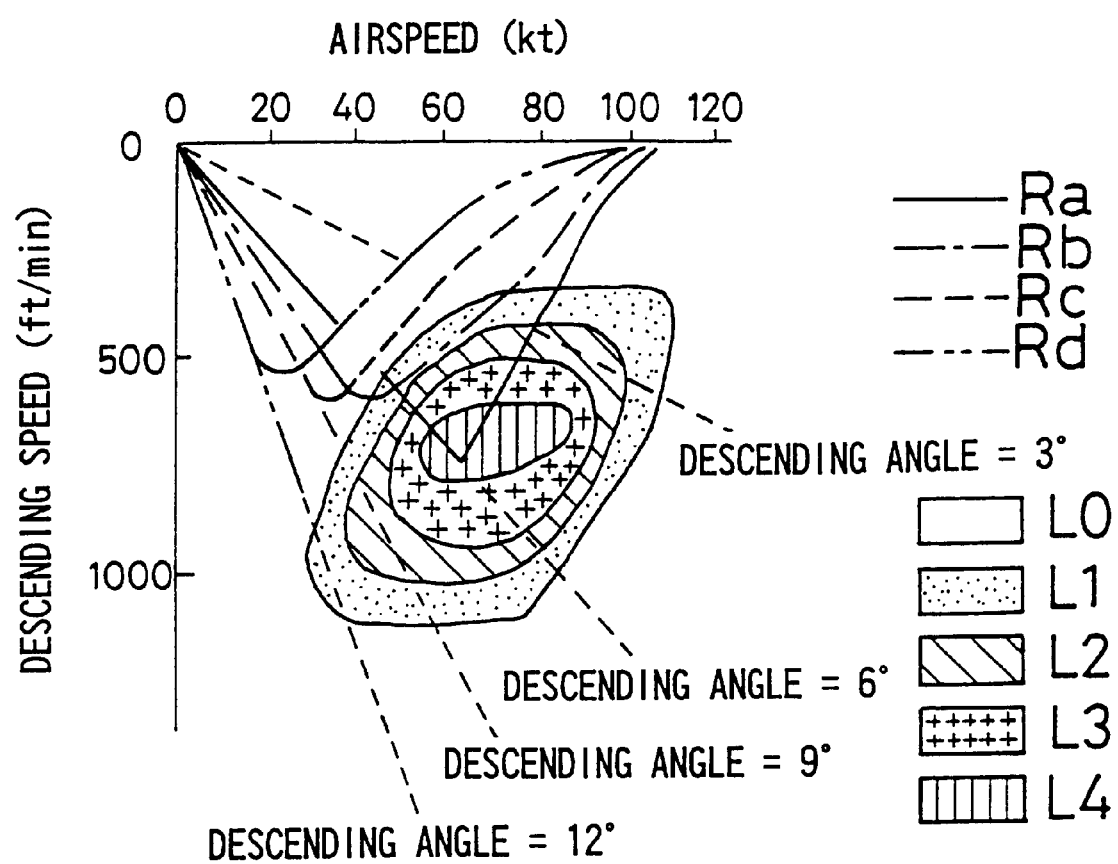
FIG. 4 is a graph showing changes in BVI noise in accordance with flight routes Ra to Rd shown in FIG. 3.

FIG. 4 is a graph showing changes in BVI noise corresponding to the flight routes Ra to Rd shown in FIG. 3. The axis of abscissas of the graph represents the airspeed of the helicopter. The axis of ordinates represents the descending speed of the helicopter, and the downward direction of the axis of ordinates is assumed to be positive. Furthermore, areas L0 to L4 in the graph are five-step level of the BVI noise. At the area L0, no BVI noise is generated. At the areas L1 to L4, BVI noise is generated, and these areas are referred to as BVI noise generating areas. The level of the BVI noise is divided into noise levels 1 to 4. This means that the noise level becomes highest when the helicopter passes through the area L4 having noise level 4.

The flight route Ra is an approach route usually taken by a helicopter, wherein the helicopter approaches the landing point with the descending angle and the airspeed fixed at 6° and about 60 kt, respectively, while decelerating simultaneously with the starting of descending. The helicopter finally further decelerates and then lands. In this case, the level of the BVI noise is very high, since the helicopter is in the area L4 when approaching the landing point.

When the helicopter takes the flight route Rb, the helicopter starts approaching at a descending angle slightly smaller than that in the case of the route Ra, the descending angle is then gradually increased to about 7° to 8° while the airspeed is lowered to about 50 kt, and the helicopter approaches the landing point and then lands. In this case, the helicopter passes through one of the BVI noise generating areas when approaching the landing point. However, since the BVI noise generating area is the area L1 wherein the BVI noise level is lowest, the helicopter can land at a noise level lower than that in the case of the route Ra.

When the helicopter takes the flight route Rc or Rd, the helicopter starts approaching at a descending angle further smaller than that in the case of the route Rb, the descending angle is then gradually increased to about 9° to 12° while the airspeed is lowered to about 30 to 40 kt, and the helicopter approaches the landing point and then lands. In this case, the helicopter can land without entering the BVI noise generating areas.

For this reason, the helicopter having the noise generating characteristics shown in FIG. 4 is desired to take the flight route Rc or Rd from the viewpoint of noise reduction. On the other hand, from the viewpoints of the flight characteristics of the helicopter and the maneuver by the pilot, the more a route is changed in such a way that the descending angle and the airspeed are changed greatly (just as in the case of the flight route Rd, for example), the more the route tends to become disadvantageous. Therefore, it is necessary to make a comprehensive judgment.

Figure 5A:
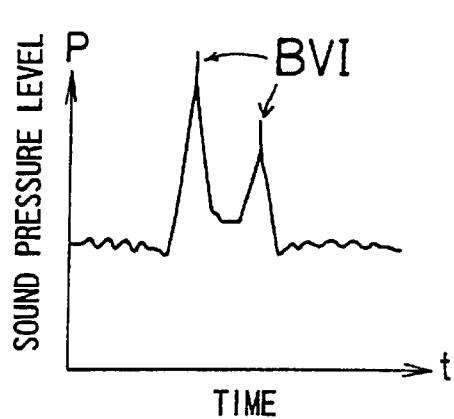
FIG. 5A is a graph showing a time histories of BVI noise.
Figure 5B:
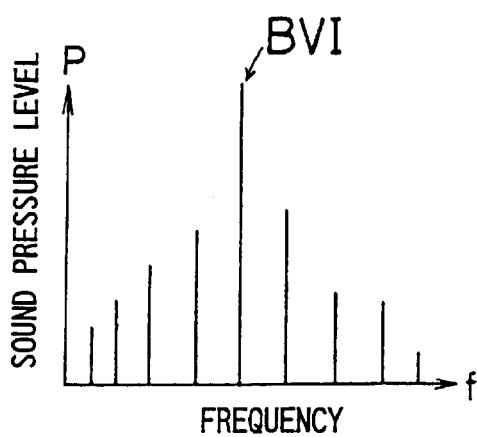
FIG. 5B is a graph showing a frequency distribution of BVI noise.

FIG. 5A is a graph showing a time history of the sound pressure of the BVI noise, and FIG. 5B is a graph showing a frequency distribution of the BVI noise. The axis of ordinates represents the sound pressure level measured by the microphone 20 installed on the ground. The BVI noise is an impulsive noise which is caused by a sudden change of the blade air load during the interaction between the blade and previously shed blade tip vortex, and large spike-like pressure changes peculiar to the BVI noise are generated as shown in FIG. 5A. These spike-like pressure changes cause a very loud noise which is louder than any other kinds of noise sources.

When the changes in the sound pressure of the BVI noise are subjected to the FFT (Fast Fourier Transform) process, a frequency distribution shown in FIG. 5B is obtained, for example, wherein the spike-like pressure changes are generated at a specific frequency range. It is therefore possible to quantitatively measure the BVI noise level by taking out only the frequency range peculiar to the BVI noise by using a band-pass filter or the like. The BVI noise level thus obtained is discriminated with respect to a plurality of threshold values, thereby being able to indicate at a plurality of level steps on the flight instrument 7.

TABLE 1 below shows how a noise level indication corresponding to noise data measured by the microphone on the ground is changed depending on the distance from the microphone to the helicopter. When it is assumed that a helicopter is positioned 500 ft away from the microphone and another helicopter is positioned 1,000 ft away from the microphone, and that the measured noise levels of these helicopters are the same, that is, 75 dB, for example, it is found that the helicopter positioned 1,000 ft away from the microphone generates a louder noise.

TABLE 1

| Noise level measured on ground (dB) | Distance from microphone to helicopter (ft) | | |
|---|---|---|---|
| | 200 | 500 | 1000 |
| 70–80 | No BVI noise | No BVI noise | Level 1 |
| 80–90 | No BVI noise | Level 1 | Level 2 |
| 90–100 | Level 1 | Level 2 | Level 3 |
| 100–110 | Level 2 | Level 3 | Level 4 |

By checking a noise level indication on the flight instrument 7, the pilot can understand which BVI noise generating area the helicopter is flying. Furthermore, when the BVI noise generating area is changed as shown in FIG. 9 because of changes in meteorological conditions such as the direction of the wind, the speed of the wind, the amount of rainfall, etc. the pilot can modify the flight route to the optimal flight route on the basis of the noise level measured on the ground.

In addition, a descending speed, an airspeed, a descending angle and a rotor rotational speed corresponding to the selected optimal flight route are determined and indicated on the flight instrument 7. The pilot controls a helicopter so that the control can conform to the various parameters indicated on the flight instrument 7, thereby enabling BVI noise generating condition to be avoided.

Furthermore, by supplying the selected optimal flight route to the flight controller 8, and by shifting the control from manual control to automatic flight control, the helicopter is automatically guided along a flight route wherein the noise level is lower, whereby low-noise level landing is possible properly without depending on the ability of the pilot.

Moreover, it is desirable that the reference levels used for such judgments as to be made in accordance with TABLE 1 should be changed in accordance with an allowable local noise regulation determined in a region wherein the helicopter is flying. For example, in urban regions wherein noise reduction is highly required, priority should be given to noise reduction, and landing flight should be carried out so that a noise having level 1 or more is not generated. On the other hand, in suburban and rural regions wherein noise does not cause any serious problems, a noise level of up to level 2 may be allowed for example. In this way, landing flight can be accomplished by taking a flight route which can be selected from among many flight routes.

Figure 6:
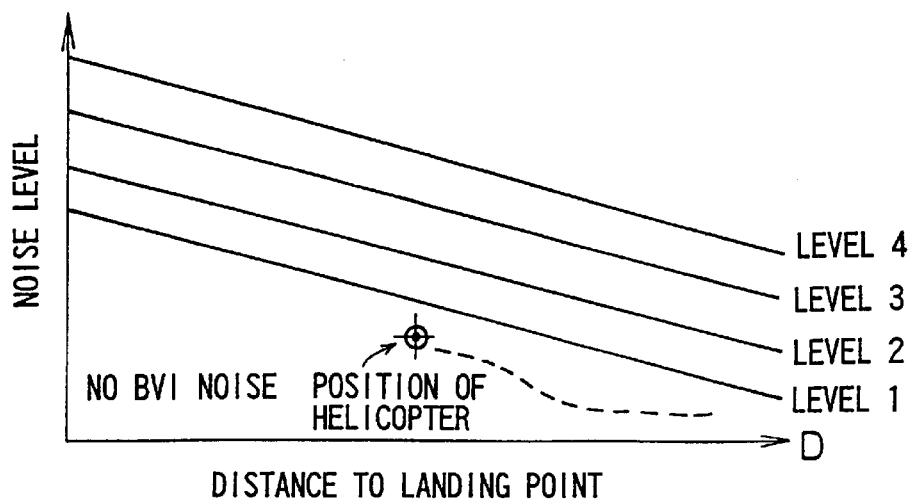
FIG. 6 is a distribution graph showing the contents of Table 1.

FIG. 6 is a graph in which the contents of TABLE 1 are converted into a distribution graph and the position of the helicopter itself is indicated. The helicopter transmits its position to the ground station at regular time intervals. The ground station calculates distance D from the helicopter to the landing point, and transmits to the helicopter a reference level corresponding to the noise level of the helicopter. As a result, the graph shown in FIG. 6 can be obtained. By indicating this distribution graph on the flight instrument 7 or the like, the pilot can understand the current noise level. In addition, if this kind of indicatory function is not provided in the helicopter, the ground station may carry out level judgment, and may give directions to the helicopter to change its route.

Figure 7A:
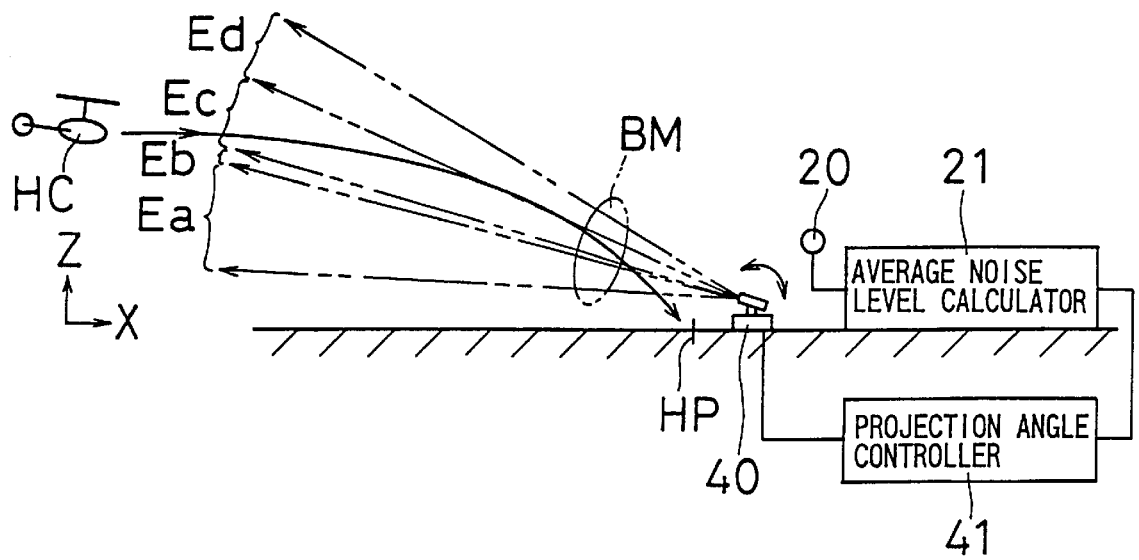
FIGS. 7A and 7B are side and plan views, respectively, showing a method of guiding a helicopter by indicating a landing approach route by using a projected light beam.
Figure 7B:
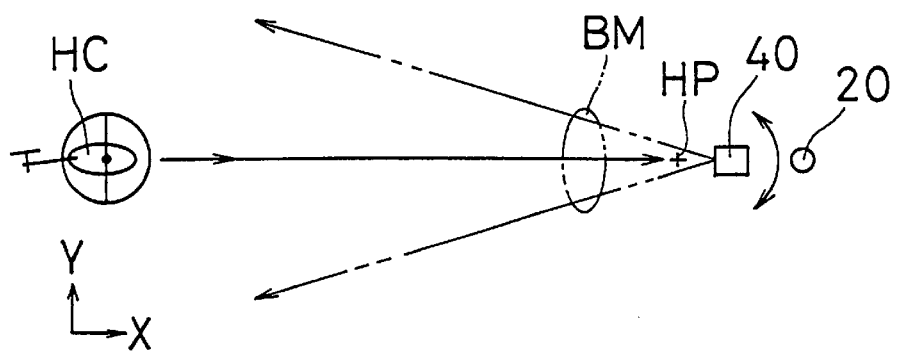
Figure 8:
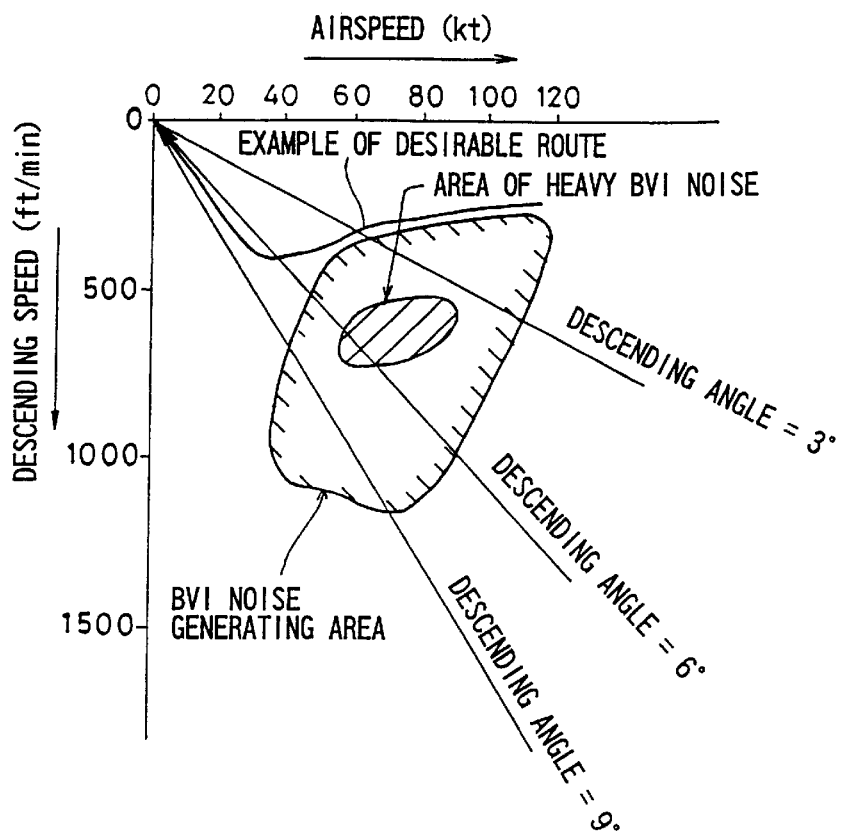
FIG. 8 is a graph showing a BVI noise generating area with respect to the airspeed and descending speed of a helicopter.

FIGS. 7A and 7B are side and plan views, respectively, showing a method of guiding a helicopter by indicating a landing approach route by using a projected light beam. A landing guide apparatus 40 is installed near the heliport HP, i. e. the landing point, and projects a landing guide light beam BM toward the helicopter HC. The landing guide light beam BM can form a plurality of projection areas in accordance with changes in the color and intensity of the light beam. For example, in a projection area Ea, a flashing red light is distributed in the range of 5° in the vertical direction. In a projection area Eb, a regular red light is distributed in the range of 0.25° in the vertical direction. In a projection area Ec, a regular green light is distributed in the range of 0.75° in the vertical direction. Furthermore, in a projection area Ed, a flashing green light is distributed in the range of 2.5° in the vertical direction. In addition, the horizontal spreading angle of the landing guide light beam BM is set at about 12° to the right and left sides from the axis of the projected light beam.

The light source of the landing guide apparatus 40 is supported rotatably in the vertical and horizontal directions, and the vertical and horizontal projection angles thereof are controlled by a projection angle controller 41.

As shown in FIG. 1, the ground station measures the noise generated from the helicopter HC by using the microphones 20, monitors the noise level by using the average noise level calculator 21, and selects the optimal flight route wherein the noise level is allowable. The landing guide apparatus 40 controls the projection angle of the landing guide light beam BM on the basis of the optimal flight route to guide the helicopter HC to the landing route. As a result, the pilot can properly carry out low-noise level visual-flight landing with reference to the landing guide light beam BM.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A low-noise level landing apparatus for helicopters, provided on a helicopter, comprising:

data receiving means for receiving noise data measured on a ground by data communication;

helicopter position calculating means for calculating a position of the helicopter;

landing route setting means for setting a landing route;

air data measuring means for measuring an airspeed and a descending speed;

rotor rotational speed measuring means for measuring a rotor rotational speed;

helicopter weight measuring means for measuring a weight of the helicopter;

noise generating area database means for storing noise levels with respect to parameters of descending speed, airspeed, descending angle, rotor rotational speed and weight of helicopter; and flight route calculating means for determining a low-noise level flight route by setting a plurality of flight routes on the basis of the helicopter position and landing point and by referring to the noise generating area database with regard to those data from each measuring means, wherein the flight route calculating means modifies a preselected flight route on the basis of the noise data from the data receiving means, and reselects an optimal flight route.

2. The low-noise level landing apparatus for helicopters of claim 1, wherein the helicopter position measuring means is composed of a differential GPS, and the data receiving means receives the noise data and differential GPS correction data.

3. The low-noise level landing apparatus for helicopters of claim 1, comprising noise level indicating means for indicating noise levels obtained by discriminating noise data on the basis of a plurality of threshold values, wherein the threshold values are variable in accordance with an altitude of the helicopter or a distance to the landing point.

4. A low-noise level landing system for helicopters comprising:

noise measuring means provided on the ground for measuring noise of a helicopter;

data transmitting means provided on the ground for transmitting noise data measured by the noise measuring means to the helicopter by data communication;

data receiving means provided on the helicopter for receiving the noise data transmitted by the data transmitting means;

helicopter position measuring means provided on the helicopter for measuring a position of the helicopter;

landing route setting means provided on the helicopter for setting a landing route;

air data measuring means provided on the helicopter for measuring an airspeed and a descending angle;

rotor rotational speed measuring means provided on the helicopter for measuring a rotor rotational speed;

helicopter weight measuring means provided on the helicopter for measuring a weight of the helicopter;

noise generating area database means for storing noise levels with respect to parameters of descending speed, airspeed, descending angle, rotor rotational speed and weight of helicopter; and flight route calculating means for determining a low-noise level flight route by setting a plurality of flight routes on the basis of the helicopter position and landing point and by referring to the noise generating area database with regard to those data from each measuring means, wherein the flight route calculating means modifies a preselected flight route, and reselects an optimal flight route.

5. The low-noise level landing system for helicopters of claim 4, wherein the helicopter position measuring means is composed of a differential GPS, the data transmitting means transmits the noise data and differential GPS correction data, and the data receiving means receives the noise data and the differential GPS correction data.

6. The low-noise level landing system for helicopters of claim 4, comprising:

a flight instrument provided on a helicopter for indicating the optimal flight route to the pilot; and a landing guide apparatus provided near a landing point on the ground for projecting a landing guide light beam toward the helicopter, wherein a projection angle of the landing guide light beam is controlled on the basis of the optimal flight route.

* * * * *